United States Patent [19]
Weissfloch

[11] Patent Number: 6,050,317
[45] Date of Patent: Apr. 18, 2000

[54] WELDING APPARATUS

[75] Inventor: Reiner Weissfloch, Stolberg, Germany

[73] Assignee: Wegener GmbH, Germany

[21] Appl. No.: 08/974,317

[22] Filed: Nov. 19, 1997

[30] Foreign Application Priority Data

Nov. 20, 1996 [DE] Germany ......... 296 20 216 U
Nov. 3, 1997 [DE] Germany ......... 297 19 434 U

[51] Int. Cl.[7] .................................. B32B 31/08
[52] U.S. Cl. .................. 156/499; 156/544; 156/555; 156/574
[58] Field of Search ................ 156/499, 544, 156/555, 574, 579, 580, 583.1

[56] References Cited

U.S. PATENT DOCUMENTS

| | | | |
|---|---|---|---|
| 4,146,419 | 3/1979 | Neidhart | 156/391 |
| 4,504,352 | 3/1985 | Meyer | 156/499 |
| 4,655,872 | 4/1987 | Neumuller et al. | 156/499 |
| 4,872,941 | 10/1989 | Lippman et al. | 156/497 |
| 4,923,558 | 5/1990 | Ellenberger et al. | 156/499 |
| 5,051,148 | 9/1991 | Resch | 156/358 |
| 5,169,052 | 12/1992 | Kaminski | 228/9 |
| 5,490,626 | 2/1996 | Kaminski | 228/44.3 |
| 5,624,511 | 4/1997 | Lippman | 156/64 |

FOREIGN PATENT DOCUMENTS

| | | |
|---|---|---|
| 359277 | 3/1980 | Austria . |
| 2700971 | 8/1977 | Germany . |
| 8612127 | 1/1988 | Germany . |
| 4000017 | 7/1991 | Germany . |
| 619175 | 9/1980 | Switzerland . |

OTHER PUBLICATIONS

EPO Search Report, Jun. 10, 1999.

*Primary Examiner*—James Sells
*Attorney, Agent, or Firm*—Liniak, Berenato, Longacre & White, LLC

[57] ABSTRACT

A welding apparatus is provided for welding overlapping film edges. In order to plasticize film edges, the apparatus includes a heating element with converging heating surfaces over which the film edges are guided. A least one leaf spring extends from a support to resiliently suspend the heating element to permit movement of the heating element perpendicular to the heating surfaces.

14 Claims, 5 Drawing Sheets

WELDING APPARATUS

The invention concerns a welding apparatus for overlapping welding of film edges, having a heating element over whose heating surfaces the film edges can be guided in order to plasticize them.

Welding apparatuses of the type described above are used in particular for welding films used in landfill construction. The films are used to seal the base of the landfill, and stringent requirements apply to the quality of the weld.

A welding apparatus of this kind is known, for example, from DE 40 000 017 A1. It has an infeed side through which the film edges, arranged in overlapping fashion, are fed in one above the other and guided over a wedge-shaped heating element as the welding apparatus is moved. This wedge-shaped heating element is arranged horizontally, i.e. the two wedge surfaces, which at the same time also constitute the heating surface, are located one above the other. The heating element is oriented with its blunt end toward the infeed side; the top film edge is guided over the top heating surface, and the lower film edge over the lower heating surface. The two heating surfaces meet toward the outfeed side in a linear wedge tip, where the two film edges are brought together by pressure and feed rollers provided there, and pressed onto one another. The pressure and feed rollers pull the film edges into the welding apparatus, thus providing the feed for the welding apparatus.

In the case of the known welding apparatus, the heating element is guided movably between a position that is pulled back toward the inlet side and an operating position in which the wedge tip is located in the immediate vicinity of the pressure and drive rollers.

In the operating position, the film edges are guided under pressure onto the heated surfaces of the heating element.

Despite this capability for displacement in one plane, the position of the heating element is not always optimum. It is, however, essential for uniform heating of the film edges on the two heating surfaces that the heating element assume a position in which the film edges are in contact with the heating surfaces over an identical distance and, if possible, also with the same application force. With the known displacement capability, this is not a certainty.

It is thus the object of the invention to configure a welding apparatus of the type cited initially in such a way that the two film edges are heated as identically as possible.

This object is achieved, according to the invention, by the fact that the heating element is suspended so as to be movable freely in at least one direction. Preferably it should be suspended substantially perpendicular to the heating surfaces and also pivotably about an axis oriented parallel to the heating surfaces and transverse to the defined movement direction of the film edges.

Suspension of the heating element in freely movable fashion, according to the invention, makes it possible for the heating element to adapt to the pressure exerted by the film edges, and thus to be able to effect pressure equalization such that the film edges rest against the heating surfaces with equal application pressure and thus also travel over the same contact distance. The film edges themselves thus provide for inclusion of the heating element in such a way that the film edges are heated identically, and optimum welding of the film edges is thus attained.

The effect according to the invention is achieved even if the heating element is suspended so that it is entirely free to move. It is advantageous, however, to suspend the heating element resiliently, specifically in such a way that when unloaded, it is already in a largely optimum position for infeed of the film edges. Automatic and optimum adaptation then occurs as a result of the application pressure of the film edges against the action of the spring, which can be configured relatively weakly and therefore present almost no resistance to optimum adaptation.

Leaf springs, which are clamped at the input side and extend toward the output side, have proven particularly suitable for suspension of the heating element. The heating elements can be suspended from the free ends thereof, the leaf springs extending, in the unloaded state, with their flat sides substantially horizontal, so that they are resilient perpendicular to the heating surface, i.e. upward or downward. The resilience is not limited to this direction; rather the leaf springs also rotation of the heating element about a horizontal axis which extends transverse to the defined movement direction of the film edges. The leaf springs thus allow optimum adaptation of the position of the heating element to the profile of the film edges. A single leaf spring arm is sufficient for suspension of the heating element. It is also possible, however, to provide multiple leaf spring arms, which advantageously end on both sides of the heating element. In this context, they should extend substantially in the direction of the defined movement direction of the film edges, specifically toward the heating element in the output direction of the welding apparatus.

There exists, of course, the possibility of combining the movable suspension of the heating element with the displacement devices known from the existing art, by suspending the heating element on a slide that is displaceable in the defined movement direction of the film edges. This slide makes it possible, when the apparatus is stopped, to bring the heating element into a pulled-back position distanced from the pressure and feed rollers in order to prevent overheating of the film edges.

The invention is illustrated in more detail, with reference to exemplifying embodiments, in the drawings, in which.

Figure 1:
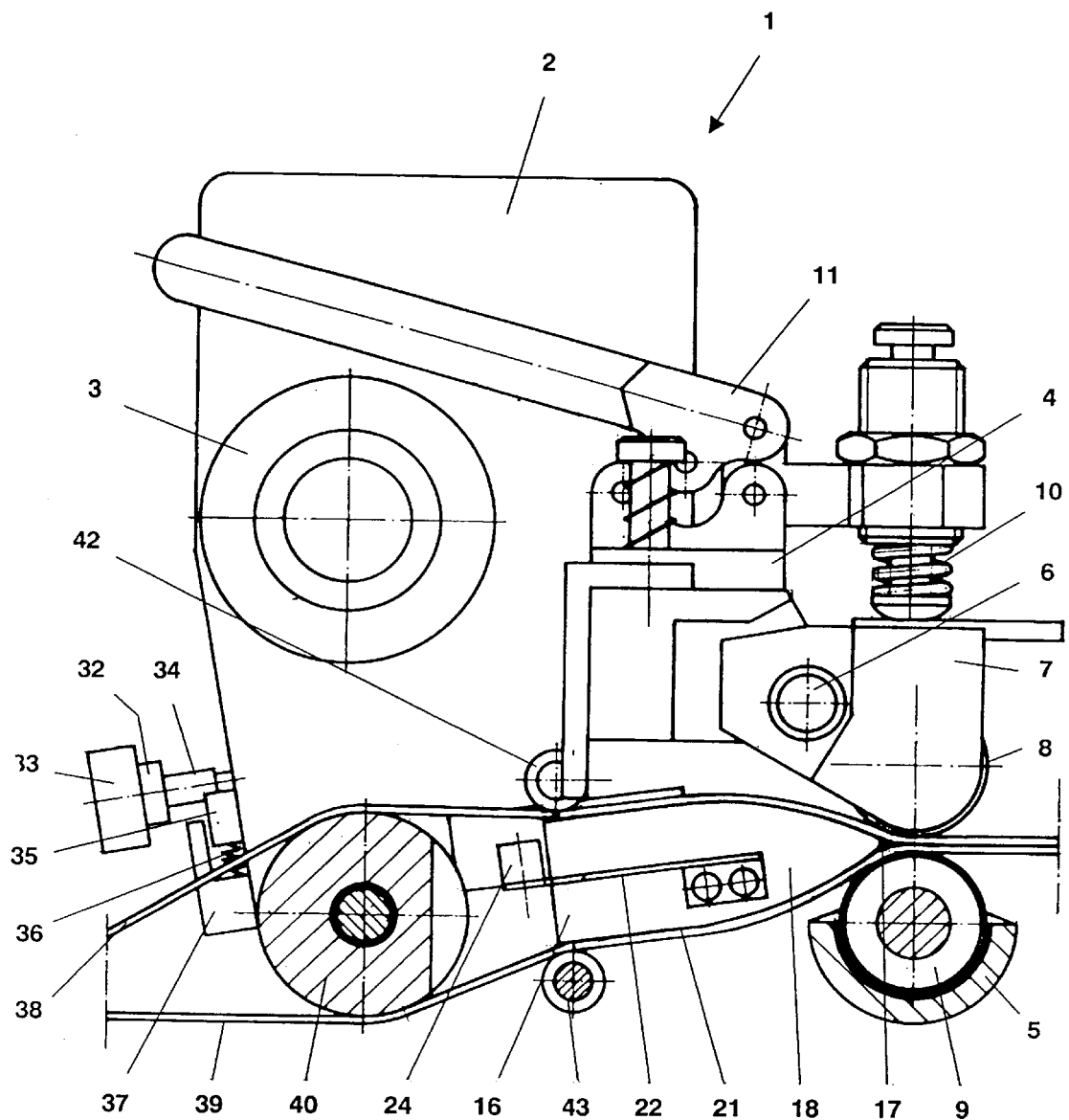
FIG. 1 shows a first welding apparatus according to the invention, in a sectioned depiction in plane A—A as shown in FIG. 2.

Welding apparatus 1 depicted in the Figures has a housing 2 on which an electric drive motor 3 is flange-mounted. An upper support 4, and below it a lower support 5, are fastened on the same side of housing 2.

A pivoting element 7, in which an upper pressure and drive roller 8 is mounted rotatably about a horizontal axis, is suspended on upper support 4 by means of a horizontal articulation axis 6. A further pressure roller 9 is mounted on lower support 5 exactly underneath the upper pressure and feed roller. Pivoting element 7 is spring-loaded, by means of a compression spring 10, in the direction of lower pressure roller 9. The spring-loading can be removed by a manually actuated mechanism 11 which will not be described here in further detail because it does not belong to the invention.

Figure 3:
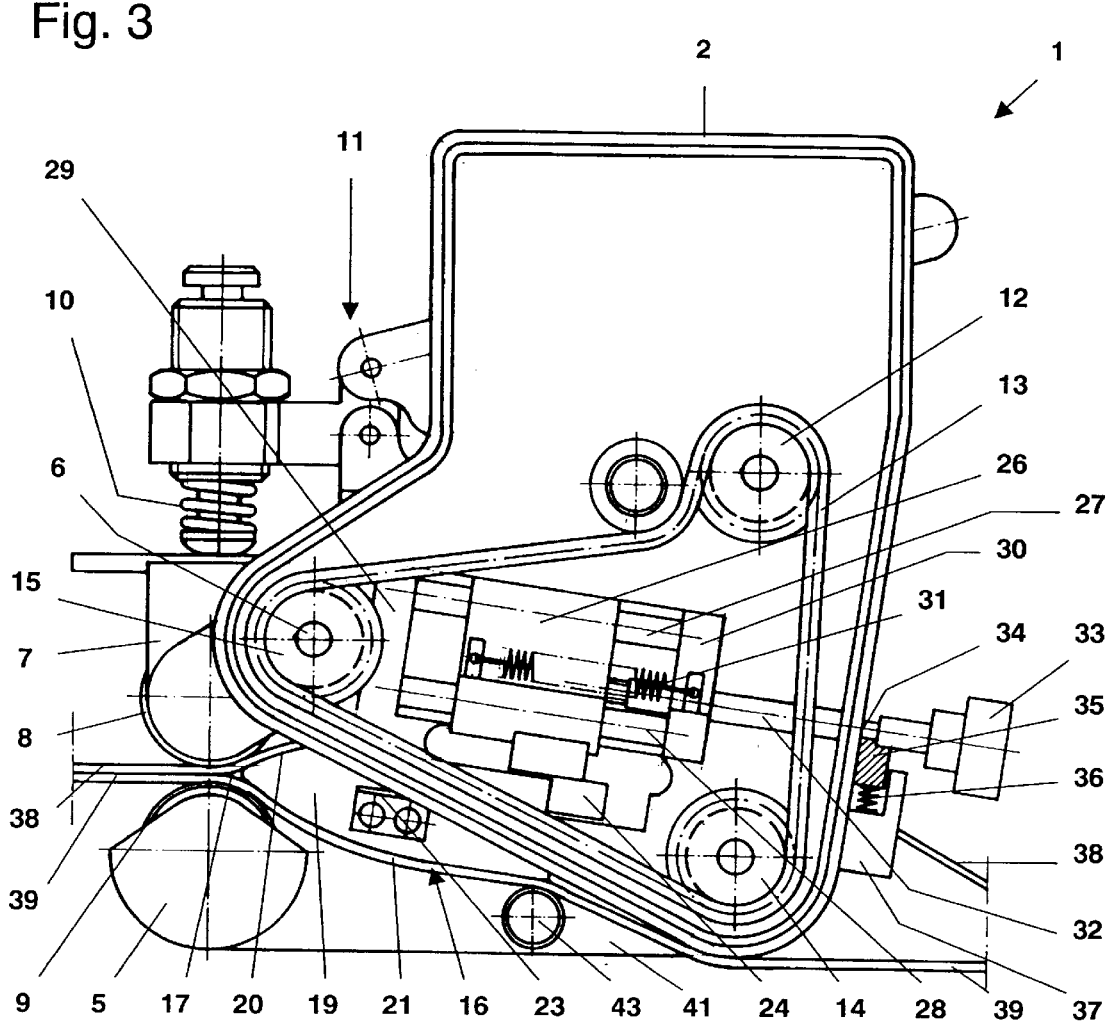
FIG. 3 shows the apparatus as depicted in FIGS. 1 and 2, in the side view X as shown in FIG. 2, with the cover removed.

As is apparent in particular from FIG. 3, a drive pinion 12 of drive motor 3 projects into housing 2. Drive pinion 12 drives a drive chain 13 which passes via a lower idler gear 14 to an output drive gear 15 which is coaxial with articulation axis 6. Output drive gear 15 is connected, via a spur gear linkage not depicted here in further detail, to upper pressure and feed roller 8. Said pressure and feed roller 8 is thereby driven by drive motor 8, counter-clockwise as viewed in FIG. 1.

Welding apparatus 1 further has a wedge-shaped heating element 16 whose wedge tip 17 projects into the region of upper pressure and feed roller 8 and lower pressure roller 9. It has two vertical side walls 18, 19 as well as upper and lower heating surfaces 20, 21. Fastened to the two side walls 18, 19 are support arms 22, 23, in the shape of leaf springs, which are joined to one another via a support element 24. Support arms 22, 23 allow heating element 16 to pivot about a horizontal axis.

Support element 24 is fastened to a slide 26 inside housing 2. Slide 26 is guided displaceably in the direction of the inlet side, substantially horizontally with a slight downward tilt, on two guide pins 27, 28 arranged one above the other. Guide pins 27, 28 are joined together via end pieces 29, 30 which in turn are retained in stationary fashion inside housing 2. A tension spring 31, the other end of which is attached to slide 26, is fastened to the inlet-side end piece 30. Tension spring 31 tries to move slide 26 toward the inlet side, i.e. from the operating position depicted in the Figures into a position pulled back toward the inlet side.

An actuation rod 32, which projects at the inlet side (view X) and ends in an operating knob 33, is connected to slide 26. On the part projecting out of housing 2, actuation knob 32 has an annular groove 34 which corresponds with a detent pawl 35 articulated pivotably on housing 2. Detent pawl 35 is spring-loaded at the bottom, in the direction of actuation rod 32, by a compression spring 36; compression spring 36 braces against a bracing element 37 which also serves to guide detent pawl 35.

Figure 4:
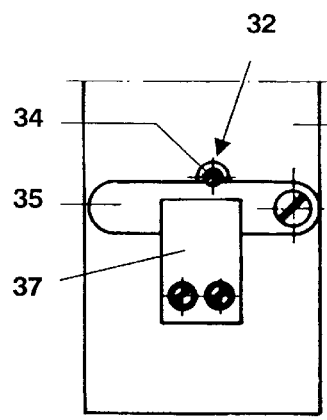
FIG. 4 shows a part of the apparatus according to FIGS. 1 to 3, viewed from the inlet side.
Figure 5:
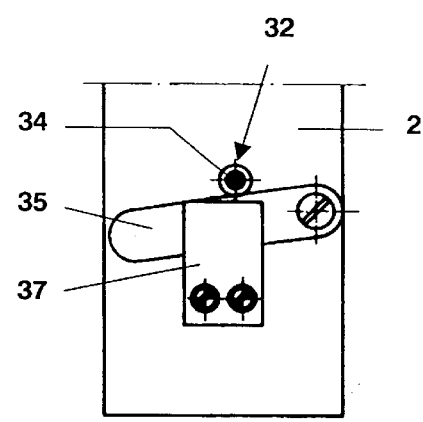
FIG. 5 shows the part according to FIG. 4, with a different pawl depiction.

In the position shown in FIGS. 3 and 4, detent pawl 35 fits into annular groove 34. As a result, actuation rod 32 and thus slide 26 and consequently also heating element 16 are locked in the operating position shown. When detent pawl 25 is pushed downward by actuation of its free end against the action of compression spring 36, it moves out of the effective region of annular groove 34 and thus releases actuation rod 32. Slide 26 is then moved toward the inlet side under the action of tension spring 31, thereby carrying heating element 16 along. It also is then moved toward the inlet side until slide 26 meets end piece 30. Heating element 16 can be moved from this position back into the operating position shown by pushing actuation rod 32, by means of operating knob 33, back toward housing 2 against the action of tension spring 31, until detent pawl 35 snaps into annular groove 34. Heating element 16 is thus once again locked in the operating position, although in easily releasable fashion.

Figure 2:
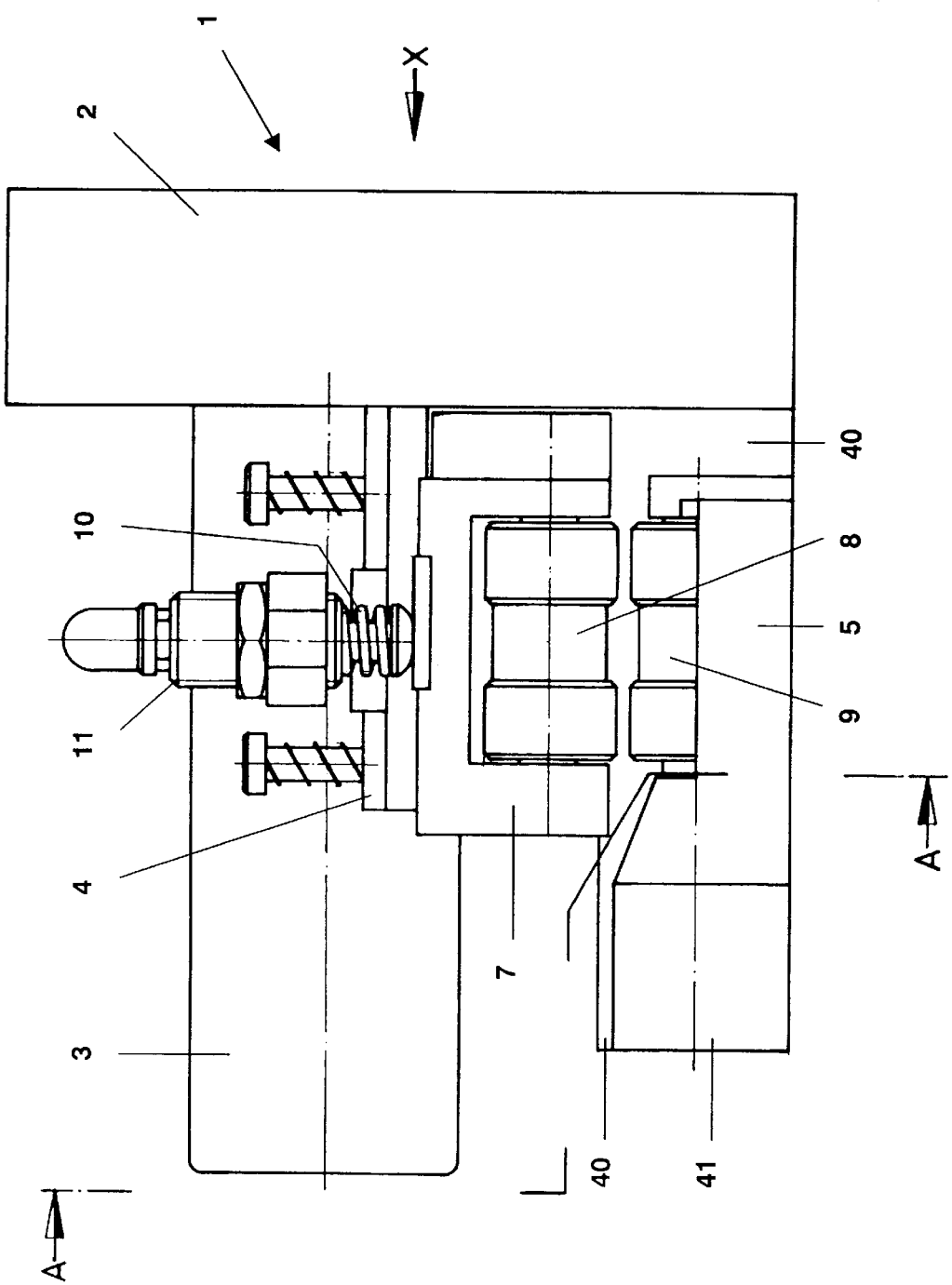
FIG. 2 shows the apparatus as depicted in FIG. 1, viewed from the outlet side.

As may be seen in particular from FIGS. 1 and 3, an upper film edge 38 and a lower film edge 39 enter via the inlet side of welding apparatus 1, upper film edge 38 sliding over the top side, and lower film edge 39 over the bottom side of a round element 40. Round element 40 is joined to housing 2 and carries, by means of a longitudinal support 41 (FIG. 2), lower support 5 with pressure roller 9. The diameter of round element 40 is greater than the height of heating element 16. Pressure rollers 42, 43 are located in the region of the blunt side of heating element 16, upper pressure roller 42 being attached to housing 2, and lower pressure roller 43 to longitudinal support 41. Pressure rollers 42 and 43 ensure contact between film edges 38, 39 and heating surfaces 20, 21 of heating element 16. In the region of upper pressure and feed roller 8 and lower pressure roller 9, they are brought together and pressed together as a result of the application pressure present there, the surfaces of film edges 38, 39 heated by heating surfaces 20, 21 being joined together and thereby welded. The welded film edges 38, 39 leave welding apparatus 1 at the outlet side.

Welding apparatus 1 is driven by way of the frictional engagement between upper pressure and feed roller 8 and upper film edge 38. Welding apparatus 1 thus pulls itself through the overlap region of film edges 38, 39. When the drive process is interrupted, i.e. when welding apparatus 1 is stopped, the operator presses detent pawl 35 downward, thereby releasing the locking of slide 26. This causes heating element 16 to be pulled back into a region where film edges 38, 39 have no direct contact with heating surfaces 20, 21. This prevents overheating of film edges 38, 39 on the sides facing one another.

Figure 6:
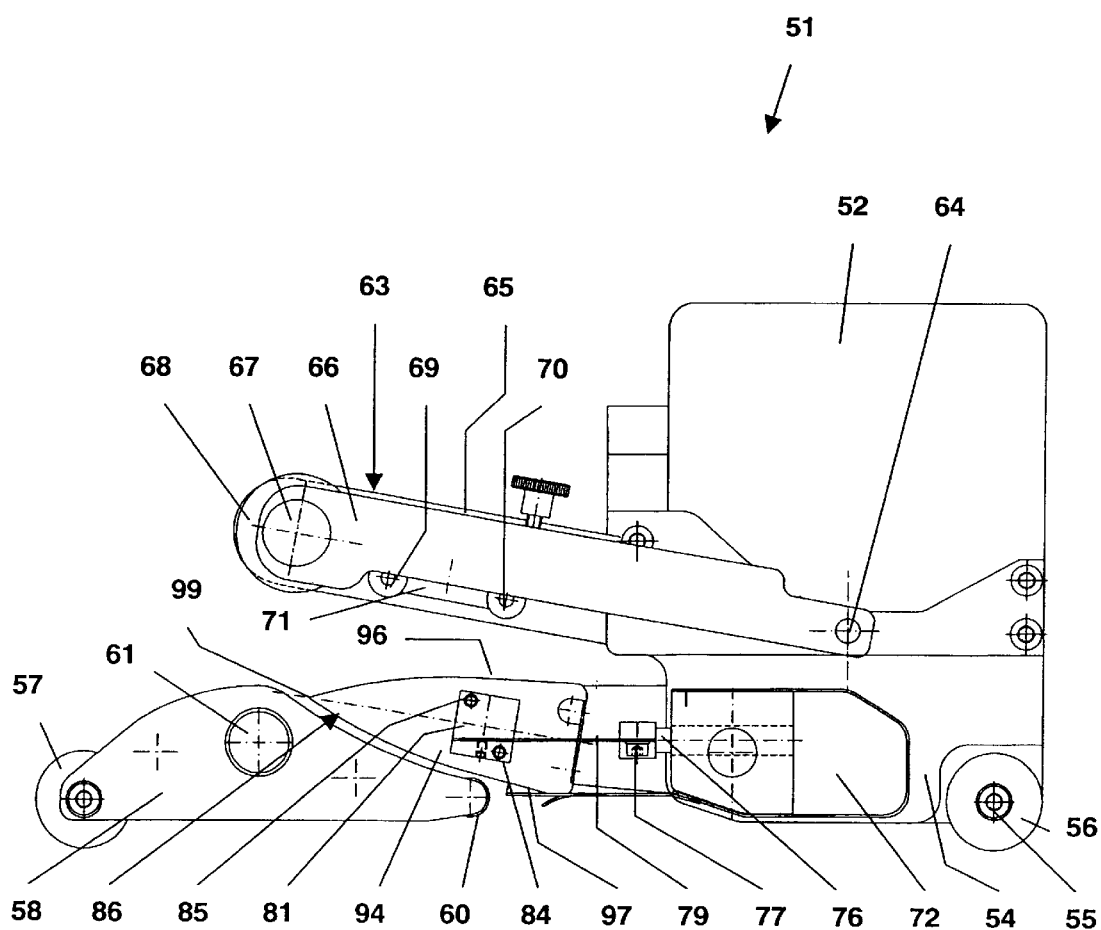
FIG. 6 shows a second welding apparatus according to the invention in a side view (with some omissions)
Figure 7:
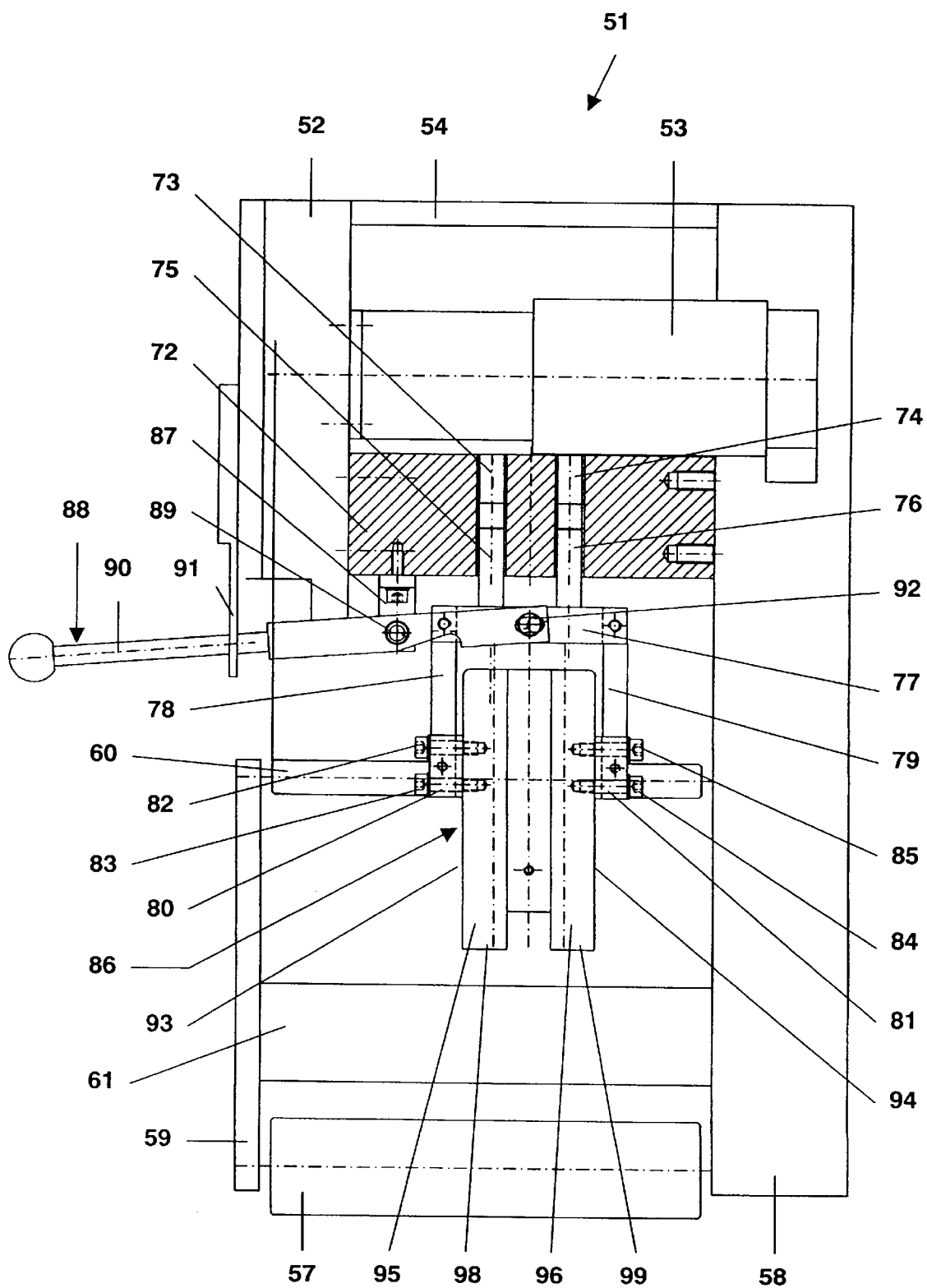
FIG. 7 shows a plan view of the welding apparatus as shown in FIG. 6 (also with some omissions).

Welding apparatus 51 depicted in FIGS. 6 and 7 is similar in basic design to welding apparatus 1 depicted in FIGS. 1 to 5. Welding apparatus 51 has a housing 52 on which an electric drive motor 53 (omitted in FIG. 5) is flange-mounted. Welding apparatus 51 has a traversing unit 54 on which a first traversing shaft with a roller 56 is mounted on the input side, and a traversing roller 57 on the output side. Traversing roller 57 is mounted on the one side on a first support 58 which passes through to the input side. Traversing roller 57 is mounted on the other side on a second support 59 which is joined rigidly to the shaft of a pressure roller 60. Mounted between the two supports 58, 59 is a pressure roller 61 which is driven by drive motor 53 via a chain drive which extends in support 58.

A pivoting element 63 (completely omitted in FIG. 7) is mounted, pivotably about a horizontal axis 64, on housing 52. Pivoting element 63 has two pivot arms 65, 66 whose free ends are joined by a drive shaft 67. A pressure roller 68 with corresponds with pressure roller 61 is located on drive shaft 67. Also arranged between pivot arms 65, 66 are pressure rollers 69, 70 which are mounted on a common pressure frame 71. Pressure rollers 68 are also driven by drive motor 53 via a chain drive that is encapsulated in pivot arm 65.

Traversing unit 54 has a crossmember 72 that is depicted in section in FIG. 7. Two guide holes 73, 74 extending parallel and horizontally, into which matching guide pins 75, 76 are inserted, are located in crossmember 72. Said pins are joined to a crossbeam 77 from whose free ends two leaf springs extend substantially horizontally and in the direction of the output side of welding apparatus 51. Leaf springs 78, 79 can bend upward and downward. Their free ends are clamped in fastening blocks 80, 81 which are fastened, each by means of two screws 82, 83 and 84, 85, to a wedge-shaped heating element 86. Heating element 86 is thus essentially suspended in vertically pivotable fashion on leaf springs 78, 79; leaf springs 78, 79 also allow a pivoting movement of heating element 86 about the horizontal transverse axis.

An actuation lever 88 is mounted, pivotably about a vertical shaft 89, on a retainer 87. Actuation lever 88 has an outwardly projecting actuation arm 90 which is pivotable in a horizontal plane inside a gate panel 91 and can be snap-locked in two positions. Actuation lever 88 is joined on the other side, via a joint 92, to crossbeam 77. By means of actuation lever 88, the unit consisting of guide pins 75, 76, crossbeam 77, leaf springs 78, 79, fastening blocks 80, 81, and heating element 86 can therefore be moved horizontally-guided by guide holes 73, 74—between a position closer to the input side and a position closer to the output side.

Heating element 86 has two vertical side walls 93, 94, and respectively two upper and two lower heating surfaces 95, 96, 97, heating surfaces 95, 96, 97 of each side being at a distance from one another. The respective mutually opposite heating surfaces 95, 96, 97 of the two sides taper into wedge tips 98, 99.

For operation of welding apparatus 51, pivoting element 63 is pivoted downward out of the position shown in FIG. 6, specifically by means of a device (not depicted here in further detail) similar to the device evident from FIGS. 1 to 5 for the case of welding apparatus 1. This brings pressure rollers 68 into contact against pressure roller 61. An upper film edge (not shown here) enters via the inlet side—specifically, as depicted in FIG. 7, as the right-hand film edge—below drive motor 53 but above support 58 and crossmember 72. The upper film edge then passes over the upper heating surfaces 95, 96, thereby being pressed by pressure rollers 69, 70 onto said heating surfaces 95, 96. As a resulting, two plasticized strips with the same spacing as heating surfaces 95, 96 are formed on the upper film edge.

In the depiction of FIG. 7, a left-hand lower film edge (not shown) simultaneously enters welding apparatus 51 from below on the input side. It is guided in contact against the underside of crossmember 72, and thus arrives at lower heating surfaces 97, being guided by pressure roller 68. The lower film edge also receives two strip-shaped plasticized regions. The upper and lower film edges come together between pressure rollers 69, 70 and pressure roller 61, in such a way that the respective plasticized strips end up resting on one another. As a result of the pressure applied by pressure rollers 69, 70, these strips join together in the manner of a weld; an unwelded region remains between the two weld seams to produce a test channel. By applying compressed air, it is possible to determine by means of this test channel whether or not the weld seams leak.

The suspension of heating element 86 on the two leaf springs 78, 79 allows heating element 86 to adapt, in terms of position and alignment, to the forces generated by the film edges in such a way that a force equilibrium is effected, allowing the film edges to rest against heating surfaces 95, 96, 97 with, as far as possible, the same force. This ensures uniform plasticization of the film edges, and thus high-quality weld seams. When welding apparatus 51 is stopped, heating element 86 can be displaced from the position shown in FIG. 6 into the position shown in FIG. 7, pulled back toward the input side, specifically by means of actuation lever 88. In this position the incoming film edges are spaced away from heating element 86 so that they are not overheated.

I claim:

1. A welding apparatus for overlap welding of film edges, comprising:

a support;

a heating element including converging heating surfaces over which film edges are guided in order to thereby be plasticized; and at least a first leaf spring extending from said support and from which said heating element is resiliently suspended for permitting movement of said heating element perpendicularly to said heating surfaces.

2. The apparatus of claim 1, wherein:

said heating element is pivotally mounted to said leaf spring.

3. The apparatus of claim 1, wherein:

said heating element has oppositely disposed sides; and there are at least two leaf springs, each leaf spring is secured to one of said sides.

4. The apparatus of claim 3, wherein:

said leaf springs extend generally in the direction in which said heating surfaces extend.

5. The apparatus of claim 1, wherein:

a slide carries said leaf spring and thereby said heating element and is displaceable for permitting shifting of said heating element between an operating position and an inoperative position.

6. The apparatus of claim 2, wherein:

a slide carries said leaf springs and thereby said heating element and is displaceable for permitting shifting of said heating element between an inoperative position and an operative position.

7. The apparatus of claim 5, wherein:

said heating element has an input end and an output end; and said slide is disposed at said input end.

8. The apparatus of claim 1, wherein:

said leaf spring extends intermediate said heating element surfaces.

9. A welding apparatus for overlap welding of film edges, comprising:

a support;

a heating element including converging heating surfaces over which film edges are guided in order to thereby be plasticized, said heating element having oppositely disposed sides; and first and second leaf springs extending from said support and from which said heating element is resiliently suspended for permitting movement of said heating element perpendicularly to said heating surfaces.

10. The apparatus of claim 9, wherein:

each leaf spring is secured to one of said sides.

11. The apparatus of claim 9, wherein:

said leaf springs extend generally in the direction in which said heating surfaces extend.

12. The apparatus of claim 9, wherein:

a slide carries said leaf springs and thereby said heating element and is displaceable for permitting shifting of said heating element between an operative position and an inoperative position.

13. The apparatus of claim 12, wherein:

said heating element has an input end and an output end; and said slide is disposed at said input end.

14. The apparatus of claim 9, wherein:

said leaf springs extend intermediate said heating element surfaces.

* * * * *